United States Patent Office 2,758,722
Patented Aug. 14, 1956

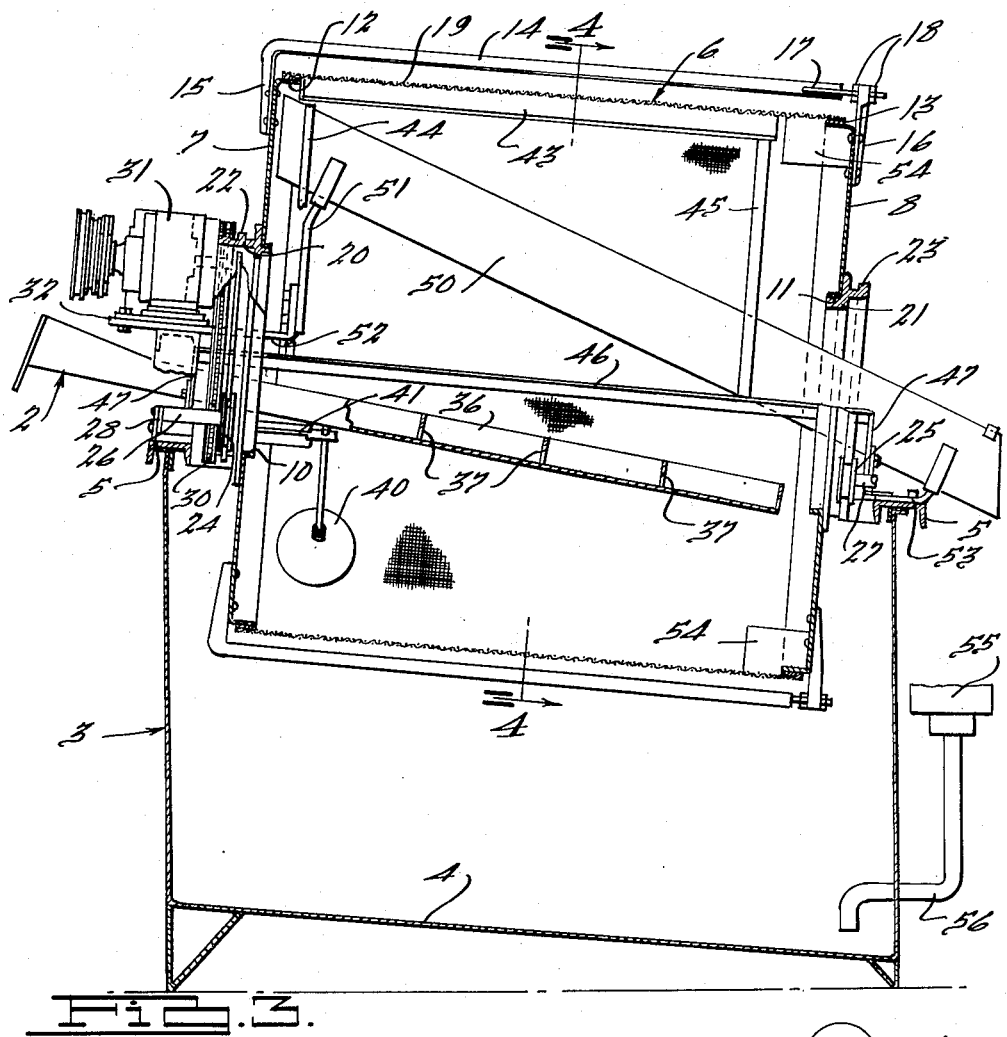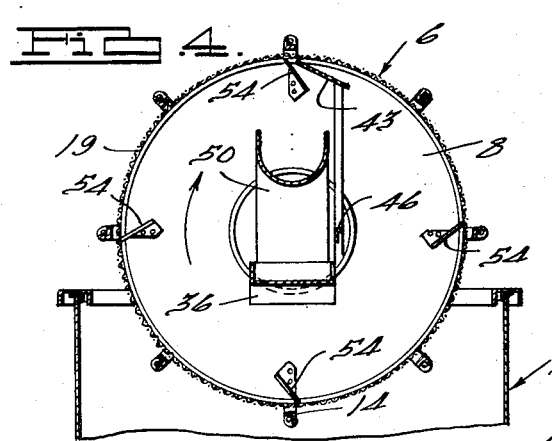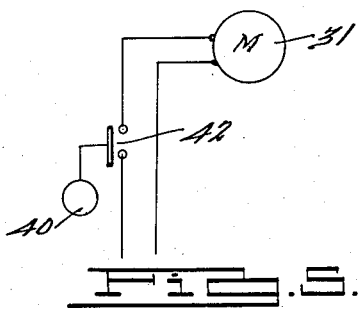

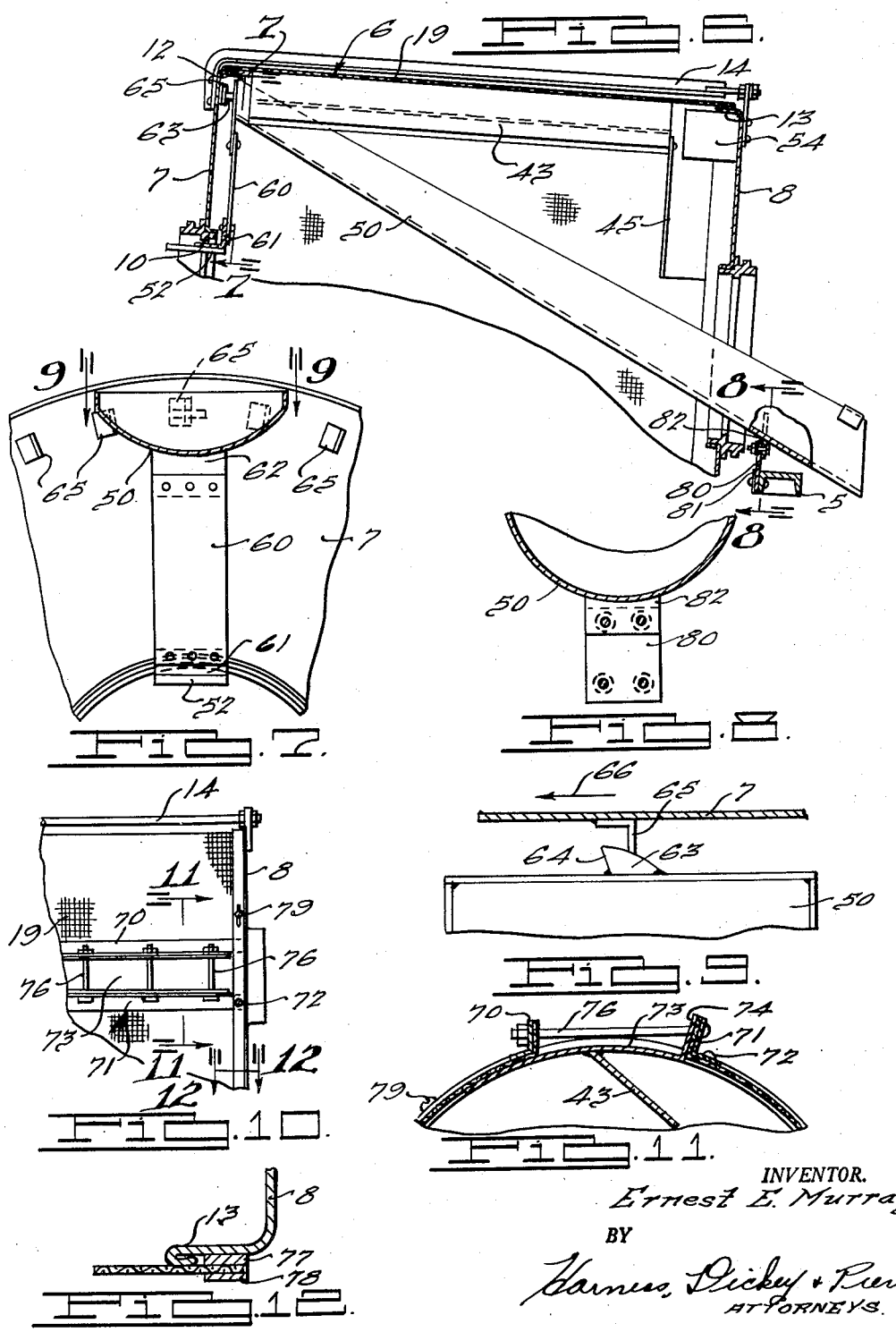

2,758,722

OIL FILTER

Ernest Eduard Murray, Birmingham, Mich.

Application September 8, 1953, Serial No. 378,892

7 Claims. (Cl. 210—199)

The present invention relates to an apparatus for removing solid foreign materials from liquids, and particularly relates to the removal of metallic foreign particles from cutting oils employed with conventional machine tools.

As is well known, cutting liquids are used with machine tools, and the recirculation and reuse of such liquids is important and desirable from the standpoint of economy. Prior devices have been employed to separate the metallic chips, cuttings and the like from the cutting liquid, but such devices have heretofore been expensive and take up considerable valuable space.

According to the present invention, the apparatus for removing the foreign material comprises a drum or cylinder having a perforate peripheral surface formed of a fine wire mesh. The cylindrical member is rotatably mounted on a tank with the lower portion of the cylindrical member disposed within the tank. Imperforate end walls are provided on the cylindrical member with central aligned openings therethrough, and the cylindrical member is mounted for rotation about its longitudinal axis, and preferably with such longitudinal axis disposed slightly at an incline or angle to the horizontal. The liquid carrying the foreign material is introduced into the interior of the cylindrical member. The wire mesh prevents the passage of the foreign particles therethrough, but the liquid, of course, drains through the openings in the mesh. As such openings become covered or clogged with the foreign material, the liquid level rises within the cylindrical member. A float is disposed within the cylindrical member which is operatively connected to a means for intermittently rotating the cylindrical member. As it is rotated, a clean or fresh mesh surface is presented on the under portion of the cylindrical member so that the liquid may drain through such cleaned surfaces until such surfaces become clogged again when the intermittent rotation is repeated. Thus, clean surfaces are intermittently being presented so that the liquid level drops and the rotation of the cylinder stops periodically.

A transversely extending scraper is disposed within the cylindrical member which removes the foreign material clinging to the inner surface of the cylinder and causes such material to drop into a chute which carries the foreign material outside of the cylindrical member and outside of the tank within which the cleaned fluid is collected. Such clean fluid may then be recirculated for reuse.

In the operation of the devices, the foreign particles, such as the metal chips and shavings, tend to mat or form clumps which may collect in the bottom of the cylindrical member and are too heavy to be carried to the top to be scraped off and dropped into the chute. In order to effectively remove these clumps, the cylindrical member is inclined at a slight angle to the horizontal, approximately 5°, so that as the cylindrical member is intermittently rotated such clumps will work their way down to the lowered end or corner of the cylindrical member. Pickup elements are disposed within such lowered corner about the periphery of the cylindrical member which will pick up such clumps and cause them either to break up so that they will cling to the wire mesh, or carry such clumps to the top position of the cylindrical member and there drop the clumps into the discharge chute. The discharge chute may be stationary or may be caused to move or vibrate to assist in moving the foreign material therealong.

One of the primary objects of the present invention is thus to provide an effective apparatus for removing foreign material from liquids which will be economical to manufacture and will take up relatively small space, to be employed particularly with cutting liquids so that such liquids may be recirculated for reuse.

A further object of the invention is to provide an improved apparatus for removing foreign particles from liquids in which such particles are collected on the interior of a cylindrical member having a perforate surface in which the foreign particles may be readily removed from the inside surface and deposited outside of the cylindrical member.

Other objects of the invention will become apparent from the following specification, the drawings relating thereto, and from the claims hereinafter set forth.

In the drawing in which like numerals are used to designate like parts in the several views throughout:

Fig. 3 is a vertical cross-sectional view of the filter mechanism shown in Figs. 1 and 2;

Fig. 4 is a cross-sectional view, on a reduced scale, taken substantially along the line 4—4 of Fig. 3;

Fig. 5 is a diagrammatic wiring diagram illustrating one electrical control system which may be employed with the present invention;

Fig. 6 is a fragmentary vertical cross-sectional view of the drum and a portion of the surrounding tank illustrating a modified form of mounting the discharge chute;

Fig. 7 is an enlarged fragmentary cross-sectional view taken substantially along the line 7—7 of Fig. 6;

Fig. 8 is an enlarged, fragmentary cross-sectional view taken substantially along the line 8—8 of Fig. 6;

Fig. 9 is a cross-sectional view taken along the line 9—9 of Fig. 7.

Fig. 10 is a partial top elevational view of a modified form of mounting the wire mesh to the cylindrical member.

Fig. 11 is an enlarged cross-sectional view taken substantially along the line 11—11 of Fig. 10.

Fig. 12 is an enlarged cross-sectional view taken substantially along the line 12—12 of Fig. 10.

Figure 1:
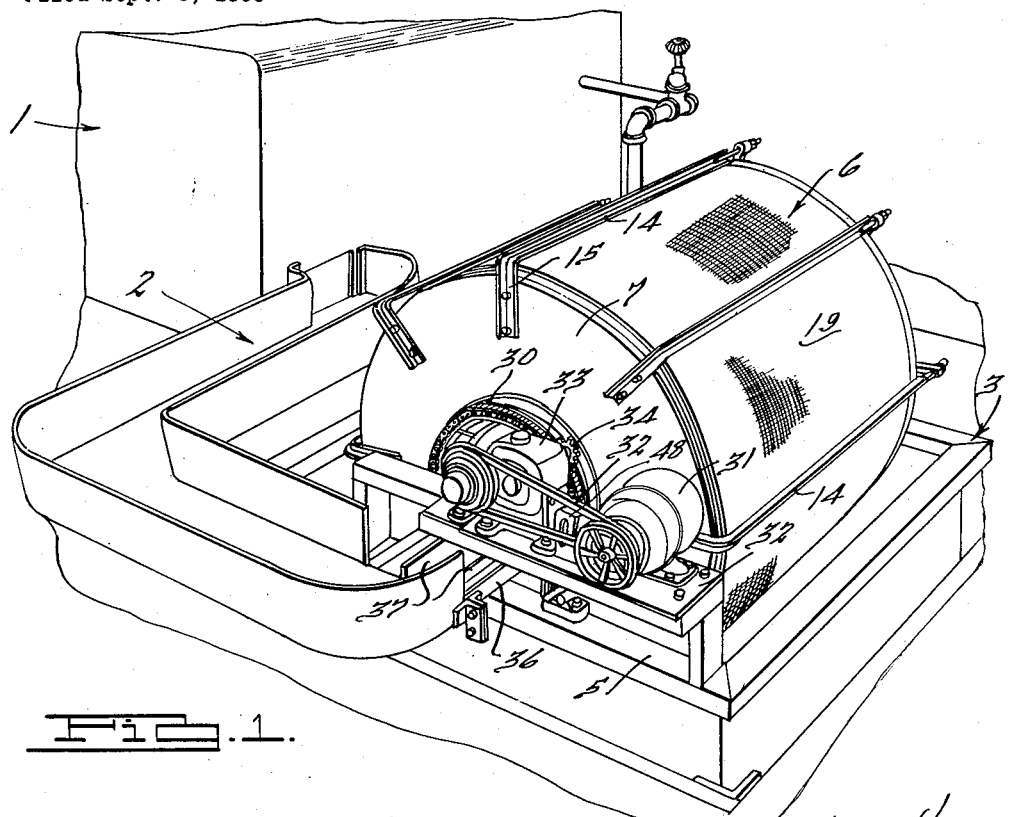
Figure 1 is a perspective view of the filtering mechanism according to the present invention and showing such mechanism in its association with a machine tool.

Referring to the drawings, a machine tool is generally indicated at 1, and such machine tool may be of any of the conventional tools in use which employ a cutting fluid. The cutting fluid is applied to the tool in the usual way, and the fluid, together with the chips or shavings, are collected in the bottom of the machine tool housing and flow therefrom through a trough or conduit generally indicated at 2. Such liquid carrying the solid foreign material is carried by the conduit 2 to the filtering device of the present invention.

Such filtering device comprises a tank generally indicated at 3, which is usually sunk in a pit adjacent the machine tool 1. The tank 3 is rectangular in form, and has a sloping bottom 4 which slopes toward one side of the tank so that all of the cleaned liquid or cutting oil may be recirculated therefrom.

Channel members 5 are mounted on, and disposed about, the upper edge of the tank 3, and serve to mount the filtering and operating mechanism thereon in a manner that will be more apparent from the following detailed description.

The filtering device comprises a cylindrical member generally indicated at 6, which comprises imperforate end members 7 and 8. The end members 7 and 8 have central aligned openings 10 and 11, respectively, which are defined by inturned flanges in the members 7 and 8. Members 7 and 8 terminate at their peripheries with inturned annular flanges 12 and 13, respectively.

The end members 7 and 8 are held in proper relationship to each other and secured with respect to each other by means of longitudinally extending rigid braces 14 which are uniformly spaced about the periphery of the end members. The braces 14 are formed with inwardly-directed angular ends 15 adjacent one end which are riveted or otherwise fixed to the end member 7. The opposite end of each member 14 is connected to the end member 8 by means of an outwardly directed bracket 16, which is suitably secured to the end member 8 by means of rivets or the like. A pin 17 is fixed to the adjacent end of the brace 14, for example, by being welded thereto, and the outwardly projecting end is threaded and received within an opening through the member 16 and secured thereto by means of nuts 18 which are threaded to the pin 17.

Thus, the end members 7 and 8 are securely fixed together by the braces 14 to form a generally cylindrical structure.

The peripheral surface of the member 6 is formed of a metallic wire mesh member 19, which is suitably secured to the outer surfaces of the inturned flanges 12 and 13 of end members 7 and 8. The perforate or mesh member 19 may be mounted on the end members for removable attachment thereto, if desired, by means of removable bands which engage the periphery of the member 19 overlying flanges 12 and 13 for holding the mesh member 19 thereon. The mesh member 19 may be of the required fineness to separate the particles according to the use to which the device is put.

The member 6 is mounted on the tank 3 for rotation thereon, and so mounted that the lower portion of the cylindrical member 6 is disposed within the tank, as best shown in Fig. 3. The mounting means comprises an annular ring 20 disposed within opening 10, and an annular ring 21 disposed within opening 11. The rings 20 and 21 are suitably fixed to their adjacent respective end members 7 and 8, as, for example, by welding.

The ring member 20 is provided with an annular flange 22, and the ring member 21 is provided with an annular flange 23 for rotatably mounting the cylindrical member 6. A pair of supporting rollers 24 and a pair of supporting rollers 25 are disposed adjacent the annular flanges 22 and 23, respectively, with one of each pair disposed on the opposite sides of the vertical center line of the opening, and both of the rollers of each pair disposed under the horizontal center lines thereof so as to rotatably support the ring members 22 and 23. The rollers 24 and 25 are grooved to receive the flanges 22 and 23 therein so that the member 6 is supported and held against lateral displacement during rotation.

The rollers 24 and 25 are mounted for free rotation upon shafts 26 and 27, respectively, and the shafts 26 and 27 are mounted upon the channel members 5 by means of brackets 28 and 29 to which they are fixed.

The mountings for the opposite ends 7 and 8 of the cylindrical member 6 are preferably such that the longitudinal axis of the member 6 is disposed at a slight inclined angle to the horizontal. This angle is exaggerated in the drawings for the purpose of illustration, and it has been found that an angle of approximately 5° is sufficient to accomplish the intended purpose which will be described hereinafter.

The cylindrical member 6 is intermittently rotated, and in order to effect such rotation a sprocket chain 30 is secured to the outer end of the member 20. Such sprocket chain serves, in effect, as a ring gear, and could be in the form of a ring gear, if desired.

Figure 2:
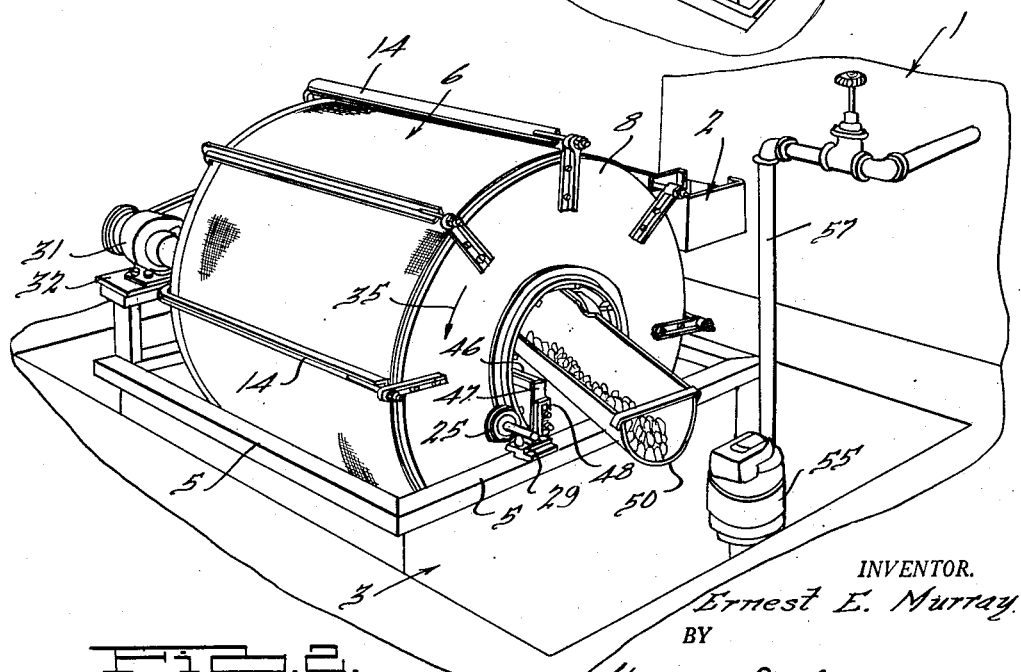
Fig. 2 is a view similar to Fig. 1 from the other side thereof.

The member 6 is intermittently rotated by means of an electric motor 31, which is mounted upon a stand 32 supported on one of the channel members 5 adjacent the end member 7. A motor 31 is connected through a suitable belt and pulley interconnection 32 to a speed reducer 33. The speed reducer 33 has a pinion 34 mounted on a projecting drive shaft, and such pinion 34 meshes with the sprocket chain or ring gear 30. By intermittent actuation of the motor 31, the member 6 is intermittently rotated in the direction of the arrow 35 in Figure 2.

The liquid carrying the foreign material from the machine tool 1 is deposited into the interior of the member 6 through opening 10 by means of an elongated chute 36, which is mounted on, and secured to, the channel member 5 adjacent opening 10. The chute 36 projects through the opening 10, into the member 6, and substantially toward the opopsite side thereof in a downward incline. In order to more or less uniformly distribute the liquid and foreign material across the entire width of the member 6, the member 36 is divided into longitudinal channels by means of longitudinally extending wall members 37, which are transversely spaced at the inlet end, and which are curved toward the open side of the member 36 at spaced points therealong so that the liquid and foreign material is channeled to various points across the member 6 and dropped onto the inner surface of that portion of member 19, which is in the bottom position. As the liquid carrying the foreign material drops onto the mesh member 19, the solid materials will cling to and be held by the mesh member 19 and the liquid will pass through the mesh. As the mesh becomes covered or clogged by the foreign material, the liquid level within the member 6 will rise, and the liquid will continue to pass through the uncontaminated mesh until its also fills with foreign material.

A float 40 is mounted within the member 6, and such float is pivotally mounted on a shaft 41 which may be suitably supported by means of a bracket on the channel member 5 through opening 10. When the float is raised to a predetermined position, it will cause a rotation of the shaft upon which it is mounted to effect the closing of a mercury switch 42, as diagrammatically illustrated in Fig. 5. This control per se is well known and forms no part of the present invention except in the combination as claimed. Upon closing the mercury switch 42, the motor 31 will be actuated to effect rotation of the member 6, and thus present clean and open mesh portions on the member 19. As such clean portions are presented, the liquid within the member 6 will flow through the open mesh, lowering the level of the liquid therein, allowing the float 40 to drop, and thereby causing the mercury switch 42 to open and the motor 31 to stop. This process is repeated, and thus intermittently fresh open mesh surfaces are presented adjacent the bottom position of the rotatable member 6, so that the separation process is, in effect, continuous.

As the cylinder 6 rotates, it carries up with it on the upgoing side the separated particles which cling to the mesh 19. A transversely extending scraper 43, preferably formed of a phenolic material, is mounted within the cylindrical member 6. The scraper 43 is supported at its ends by means of depending rigid members 44 and 45, which, in turn, are supported on a transversely extending member 46. The member 46 projects outwardly through openings 10 and 11, and has depending integral angular ends 47. The ends 47 are adjustably mounted on upstanding brackets 48 which are, in turn, supported upon the adjacent channel members 5. Bolts extending through openings in the depending members 47 extend through a vertical slot formed in the member 48, and nuts may be applied to the projecting ends of the bolts in order to adjustably fix the position of the member 46. The scraper member 43 projects upwardly toward, and in resilient engagement with, the inner surface of the mesh 19, and, as such surface rotates past the engaging edge of the scraper 43, the foreign material is scraped free so that the mesh is cleaned. Open or clean portions of the mesh are presented on the downwardly moving side of the cylinder.

The foreign material scraped off the mesh drops and falls into a discharge trough 50, which is disposed under the scraper 43, as best shown in Fig. 4. One end of the discharge chute 50 is supported by an upstanding member 51, which, in turn, is mounted upon a bracket 52. The bracket 52 projects through the opening 10 and is mounted on the supporting plate 32. The opposite end of the discharge chute projects through opening 11 and is supported on a bracket 53, which, in turn, is supported on the top of the adjacent channel 5. The discharge chute 50 is of such length that it projects beyond the edge of the tank so that any material collected therein will be discharged outside the tank 3.

It has been found that the foreign material which collects in the bottom of the cylindrical member 6 has a tendency to form into mats or clumps. Such mats or clumps are too heavy to be carried by the mesh 19 to the top position of the cylinder for engagement with the scraper 43. As mentioned previously, the cylinder 6 is mounted at a slight angle to the horizontal, so that as the cylinder rotates, any clumps will work down toward the lowered end or corner of the cylindrical member 6. Pickup elements 54 are mounted in the peripheral corner of the cylindrical member 6 to the end member 8 at spaced points therearound, and are disposed at an angle to the mesh 19, as best shown in Fig. 4. Any clumps or mats of foreign material will thus be deposited into the corner within which the pickup elements 54 are disposed, and such elements will then carry such clumps to the top position and drop them into the discharge chute 50.

The cleaned liquid collects in the bottom of the tank 3 and may be recirculated for reuse in the machine 1 by means of a pump 55 having an inlet pipe 56 communicating with the interior of the tank 3 adjacent the lowest side thereof and having an outlet pipe 57 which leads back to the liquid supply line for the machine 1.

Referring to Figs. 6 to 9, a modified form of mounting the discharge chute is illustrated in which the chute is so mounted and means are provided to move or vibrate it as the drum rotates to assist in moving the foreign material therealong and out the discharge end of the chute.

Instead of mounting the upper end of the chute 50 on the rigid support 51, as shown in the embodiment above described, the upper end of the chute is mounted for longitudinal movement on a flat spring member 60. The lower end of the flat spring member 60 is connected to the upper end of a rigid plate 61, which, in turn, is mounted to the inner end of the bracket 52. The upper end of the spring 60 is connected to a depending rigid portion 62 which, in turn, forms an integral part of the end of the chute 50.

The opposite or lower end of the chute is mounted for corresponding longitudinal movement on a flexible mount which consists of a flexible leather member 80. Such member 80 is vertically positioned and mounted adjacent its lower end to the inside face of the adjacent channel member 5 of the tank. A metal washer 81 is preferably disposed on the exposed face of the member 80 at the lower end and bolted to the channel 5 along with the member 80. The upper end of the flexible member 80 is bolted to the lower end of a metal cradle 82 which, in turn, is fixed to the under side of the chute 50.

A cam member 63 is fixed to the rear face of the upper end of the chute 50 and has an undercut following side 64, as shown in Fig. 9. The rotating drum end 7 has a plurality of angle members 65 fixed to the inner surface thereon adjacent the outer periphery with a portion projecting inwardly and in the path of the cam member 63.

A suitable number of such members 65 may be provided around the member 70, preferably at equally spaced distances, and it will be appreciated that, as the cylindrical member rotates in the direction of the arrow 66, the inwardly projecting portions of the angle member 65 will pass into contact with the cam surface of the member 63, causing it and the chute 50 to move away from the member 7. As the projection 65 passes over the end of the cam member 63, the spring 60 will cause the chute to snap back in the reverse direction and, as the drum rotates causing this rigid longitudinal member to snap back of the chute, the foreign material collected therein will be caused to move along the conveyor and be discharged.

The leather support 80 is of sufficient rigidity to support the chute 50, but will permit longitudinal movement of the chute without interfering with the action of the spring support 60. In Figs. 10, 11 and 12 a modified form of mounting the wire mesh member 19 is illustrated so that such mesh member may be conveniently removed and reapplied, and the mechanism of the inside of the drum conveniently accessible for servicing.

The cylindrical mesh member is mounted upon the inturned flanges 12 and 13 of the end members 8, but in the illustration it is only shown as being applied to the inturned flange 13 of member 8, it being understood that the mounting on the opposite end is of the same construction. The circumferential length of the mesh 19 is less than the circumference of the drum, and one end of the mesh is turned upwardly and fixed to the inner face of a transversely extending angle member 70. The ends of the upstanding portion of the angle member 70 are removed in those portions which overlie the inturned flanges 13. The opposite side of the mesh member 19 is likewise fixed to the inner faces of a transversely extending angle member 71, which also has the upstanding portions removed at the ends overlying the inturned flanges 12 and 13. The ends of the member 71, together with that end of the mesh member 19, are fixed to the inturned flanges 12 and 13 by means of screws 72.

An imperforate plate member 73, which is curved to the curvature of the drum, extends transversely of the drum and has a transversely extending angular portion 74, which is adapted to abut against and be attached to the outstanding flange of angle member 71. The inner end of the plate member 73, indicated at 75, lies on the inside and against the mesh member 19 under the angle 70. Plate member 73 is mounted to the angle members 70 and 71 by means of hook bolts 76. A plurality of such bolts 76 are provided across the drum, and one end of the bolt is hooked and the other end threaded. The bolt is passed through openings in the members 71, 74 and 70, and a nut is threaded to the bolts to take up any slack in the mesh drum and mount the parts in their properly assembled relation.

It will thus be seen that the end of the mesh attached to the angle member 70 may move relative to the plate member 73 and toward the angle 71 by tightening the nuts on the bolt, and thus pulling the mesh member taut on the drums.

The mesh member 19 is soldered to a circular band 77 at each end, and such band is disposed against its adjacent inturned flange 12 or 13, as shown in Fig. 11. A detachable metal band 78 is then applied to each end, as shown in Fig. 11, to securely hold the screen in place on the drum ends.

After the screen has been held taut and assembled, screws 79 are applied through elongated slots in the bands 77 and 78 and into a tapped opening in the flanges 12 and 13, so as to secure the assembly.

It will be appreciated that the band may be readily removed for replacement, and also that the plate 73 may be readily removed to provide access to the interior of the drum without the necessity of removing the entire mesh band therefrom. Such access may be required for assembly and service or repair work. The metal member is curved to the curvature of the drum and is substantially flush with the inner surface of the screen 19, so that it readily moves past the scraper 43 on rotation of the drum.

Formal changes may be made in the specific embodiments shown without departing from the spirit and substance of the invention, the scope of which is commensurate with the appended claims.

What is claimed is:

1. Apparatus for removing foreign material from liquid comprising a tank, a rotatable cylindrical member having a perforate peripheral surface, means mounting said cylindrical member with the lower peripheral portion thereof disposed within said tank, said mounting means being so constructed as to rotatably mount said member, means to introduce liquid carrying foreign material into said member, means to intermittently rotate said member to separate said foreign material from said liquid, a scraper element mounted within said member and disposed to engage the inner peripheral surface thereof to remove foreign material therefrom, and a discharge chute disposed within said member under said scraper element and extending outwardly thereof to remove said foreign material from said cylindrical member.

2. Apparatus for removing foreign material from liquid comprising a tank, a rotatable cylindrical member having a perforate peripheral surface, means mounting said cylindrical member with the lower peripheral portion thereof disposed within said tank, said mounting means being so constructed as to rotatably mount said member for rotation about an axis at an inclined angle to the horizontal, means to introduce liquid carrying foreign material into said member, means to intermittently rotate said member to separate said foreign material from said liquid, a scraper element mounted within said member and disposed to engage the inner peripheral surface thereof to remove foreign material therefrom, and a discharge chute disposed within said member under said scraper element and extending outwardly thereof to remove said foreign material from said cylindrical member.

3. Apparatus for removing foreign material from liquid comprising a tank, a rotatable cylindrical member having a perforate peripheral surface, said cylindrical member having imperforate end members provided with aligned central openings therethrough, means mounting said cylindrical member with the lower peripheral portion thereof disposed within said tank, said mounting means being so constructed as to rotatably mount said member for rotation about an axis at an inclined angle to the horizontal, means to introduce liquid carrying foreign material into said member, means to intermittently rotate said member to separate said foreign material from said liquid, a scraper element mounted within said member and disposed to engage the inner peripheral surface thereof to remove foreign material therefrom, and a discharge chute disposed within said member under said scraper element and extending outwardly thereof to remove said foreign material from said cylindrical member.

4. Apparatus for removing foreign material from liquid comprising a tank, a rotatable cylindrical member having a perforate peripheral surface, said cylindrical member having imperforate end members provided with aligned central openings therethrough, means mounting said cylindrical member with the lower peripheral portion thereof disposed within said tank, said mounting means being so constructed as to rotatably mount said member for rotation about an axis at an inclined angle to the horizontal, means to introduce liquid carrying foreign material into said member, means to intermittently rotate said member to separate said foreign material from said liquid, a transversely extending scraper element mounted within said member adjacent the top thereof and disposed to engage the inner peripheral surface thereof to remove foreign material therefrom, and a discharge chute disposed within said member under said scraper element and extending outwardly thereof to remove said foreign material from said cylindrical member.

5. Apparatus for removing foreign material from liquid comprising a tank, a rotatable cylindrical member having a perforate peripheral surface, means mounting said cylindrical member with the lower peripheral portion thereof disposed within said tank, said mounting means being so constructed as to rotatably mount said member for rotation with the longitudinal axis of said member disposed at an inclined angle to the horizontal so that the peripheral surface of said member slopes toward one end thereof, a transversely extending scraper element mounted within said member adjacent the top thereof and disposed to engage the inner peripheral surface thereof to remove foreign material therefrom, a plurality of inwardly projecting pickup elements disposed within said member adjacent to, and spaced around, the periphery and adjacent said one end thereof and rotatable with said member to carry foreign material upwardly with said member, means to introduce liquid carrying foreign material into said member and to distribute said liquid carrying foreign material along the length of said member, means to intermittently rotate said member, and a discharge chute disposed within said member under said scraper element to remove said foreign material from said member.

6. Apparatus for removing foreign material from liquid comprising a tank, a rotatable cylindrical member having a perforate peripheral surface, means mounting said cylindrical member with the lower peripheral portion thereof disposed within said tank, means to introduce liquid carrying foreign material into said member, means to rotate said member, a scraper element mounted within said member and disposed to engage the inner peripheral surface thereof to remove foreign material therefrom, a discharge chute disposed within said member under said scraper element and extending outwardly thereof, means mounting said chute for longitudinal movement including a resilient element, and means for moving said chute against the action of said resilient element upon rotation of said cylindrical member.

7. Apparatus for removing foreign material from liquid comprising a tank, a rotatable cylindrical member having a perforate peripheral surface, means mounting said cylindrical member with the lower peripheral portion thereof disposed within said tank, means to introduce liquid carrying foreign material into said member, means to rotate said member, a scraper element mounted within said member and disposed to engage the inner peripheral surface thereof to remove foreign material therefrom, a discharge chute disposed within said member under said scraper element and extending outwardly thereof, means mounting said chute for longitudinal movement including a resilient element, and means for moving said chute against the action of said resilient element upon rotation of said cylindrical member, said last-named means including actuator elements mounted on said cylindrical member for rotating therewith, and a cam member mounted on said chute disposed in the path of movement of said actuator elements.

(References on following page)

References Cited in the file of this patent

UNITED STATES PATENTS

| | | |
|---|---|---|
| 558,572 | Schacke | Apr. 21, 1896 |
| 1,103,725 | Wood | July 14, 1914 |
| 1,332,006 | Schadt | Feb. 24, 1920 |
| 1,441,870 | Megraw | Jan. 9, 1923 |
| 1,880,273 | Pardee et al. | Oct. 4, 1932 |
| 2,014,144 | Mensing | Sept. 10, 1935 |
| 2,055,869 | Manning | Sept. 29, 1936 |
| 2,125,472 | Taylor | Aug. 2, 1938 |
| 2,196,793 | Hall | Apr. 8, 1940 |
| 2,206,593 | Beebe | July 2, 1940 |
| 2,237,603 | Kapp | Apr. 8, 1941 |
| 2,321,243 | Range | June 8, 1943 |
| 2,416,499 | Saxe | Feb. 25, 1947 |
| 2,439,774 | Jaeger | Apr. 13, 1948 |
| 2,664,203 | Crane et al. | Dec. 29, 1953 |